United States Patent [19]

Naka

[11] Patent Number: 4,565,005

[45] Date of Patent: Jan. 21, 1986

[54] RIGHT-ANGLE INDEX DEVICE

[75] Inventor: Masayasu Naka, Saitama, Japan

[73] Assignee: Kyowa Kentetsu Kabushiki Kaisha, Japan

[21] Appl. No.: 618,138

[22] Filed: Jun. 7, 1984

[30] Foreign Application Priority Data

Dec. 22, 1983 [JP] Japan .................. 58-198306[U]

[51] Int. Cl.⁴ .............................................. G01B 3/10
[52] U.S. Cl. ...................................... 33/1 G; 33/138; 33/413
[58] Field of Search ............. 33/1 F, 1 G, 1 AP, 138, 33/139, 413

[56] References Cited

U.S. PATENT DOCUMENTS

| 707,862 | 8/1902 | Netherland | 33/139 |
| 870,884 | 11/1907 | Holinger | 33/138 |
| 2,240,753 | 5/1941 | Bouchard et al. | 33/138 |
| 3,979,833 | 9/1976 | Grundman | 33/1 G |

FOREIGN PATENT DOCUMENTS

| 102600 | 4/1899 | Fed. Rep. of Germany | 33/139 |
| 925075 | 3/1955 | Fed. Rep. of Germany | 33/138 |
| 1912735 | 10/1970 | Fed. Rep. of Germany | 33/138 |
| 2052745 | 1/1981 | United Kingdom | 33/138 |

Primary Examiner—Richard R. Stearns
Attorney, Agent, or Firm—Cantor and Lessler

[57] ABSTRACT

A right-angle index device comprising two unextensible tapes having hook means at one free end, a first mechanism for withdrawing said both tapes by the same length under controlled conditions, a second mechanism for stopping said first mechanism to fix the length of said both tapes at the desired value, a take-up mechanism for rolling up said both tapes through said first and second mechanisms, to which the other ends of said both tapes are fixed, and casing means for accommodating therein said first and second mechanisms and said take-up mechanism and allowing said both tapes to be rolled around said take-up mechanism for withdrawal.

8 Claims, 5 Drawing Figures

RIGHT-ANGLE INDEX DEVICE

BACKGROUND OF THE INVENTION

The present invention relates to a right-angle index device which assures simple and easy determination of right angles without using any large square.

A large square is awkward and cannot be handled with only two hands, and poses parallax and other problems.

SUMMARY OF THE INVENTION

A main object of the present invention is therefore to provide a novel, useful right-angle index device which is free from the drawbacks of the prior art, easy to carry, suitable for use in the fields of construction work, civil engineering, etc., and assures simple and easy determination of right angles even by one operator.

According to the present invention, this object is achieved by the provision of a right-angle index device comprising in combination two unextensible tapes having hook means at their free ends, a first mechanism for withdrawing said tapes by the same length under controlled conditions, a second mechanism for stopping said first mechanism to fix the length of said both tapes at the desired value, a take-up mechanism for rolling up said both tapes through said first and second mechanisms, to which the other ends of said both tapes are fixed, and casing means for accommodating therein said first and second mechanisms and said take-up mechanism and allowing said both tapes to be rolled around said take-up mechanism for withdrawal.

DETAILED DESCRIPTION OF THE INVENTION

Figure 1:
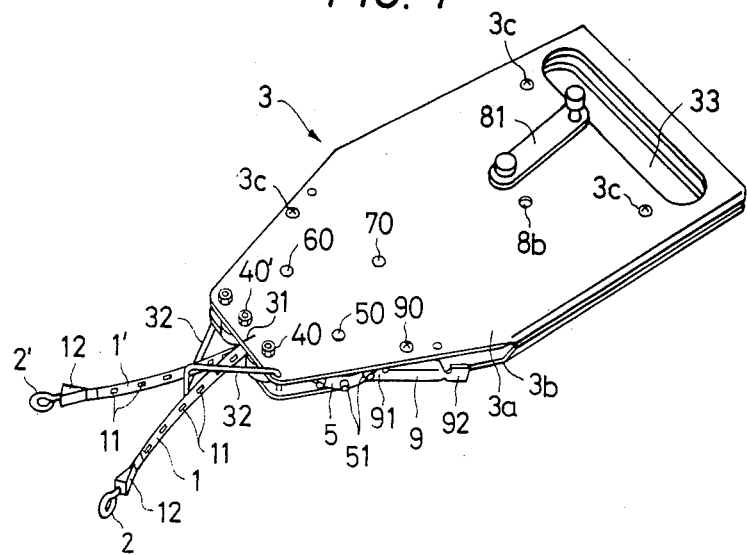
FIG. 1 is a perspective view showing one embodiment of the right-angle index device of the present invention.

Referring to one embodiment of the present invention illustrated in the accompanying drawings, reference numerals 1 and 1' denote unextensible tapes, 2 and 2' are hooks provided at the free ends of said tapes, 3 is a case, 4 and 4' are guide wheels, 5 is a ratchet wheel (sprocket), 6 is a grooved wheel, 7 is a relay wheel, 8 is a take-up wheel and 9 denotes a stop pawl. These means or parts are constructed as follows.

The unextensible tapes 1 and 1' are formed in a similar manner. Each tape, formed of an unextensible material, e.g., steel, is provided over its length and at regular intervals with a number of holes 11 within which the ratches 51 of the ratchet wheel 5 engage, and at its free end with end means 12 including a turnable hook 2 or 2' which is hung on a peg driven in the given position.

The case 3 comprises two plates 3a and 3b of the same shape, which are joined by suitable fitting means 3c in parallel relation and with a given space therebetween, in which various mechanisms are received.

The guide wheels 4 and 4' are rotatably supported by the associated shafts 40 and 40' in an opening in the case 3 with a gap therebetween, through which the tapes 1 and 1' pass.

The ratchet wheel 5, grooved wheel 6 and relay wheel 7 are rotatably supported by the associated shafts 50, 60 and 70 within the case 3. The ratchets 51 of the wheel 5 are operatively associated within an annular groove 61 formed in the outer periphery of the wheel 6 to retain the tapes 1 and 1' between the outer peripheries of both wheels 5 and 6. The ratchets 51 of the wheel 5 engage within the holes 11 in both tapes 1 and 1', which are in phase with each other, whereby both tapes 1 and 1' are withdrawn by the same amount. The relay wheel 7 is arranged such that it serves to guide the tapes 1 and 1' at a position remote from both wheels 5 and 6, and allows at least two or three ratchets 51 of the wheel 5 to engage within the holes 11 in both tapes 1 and 1'.

Figure 2:
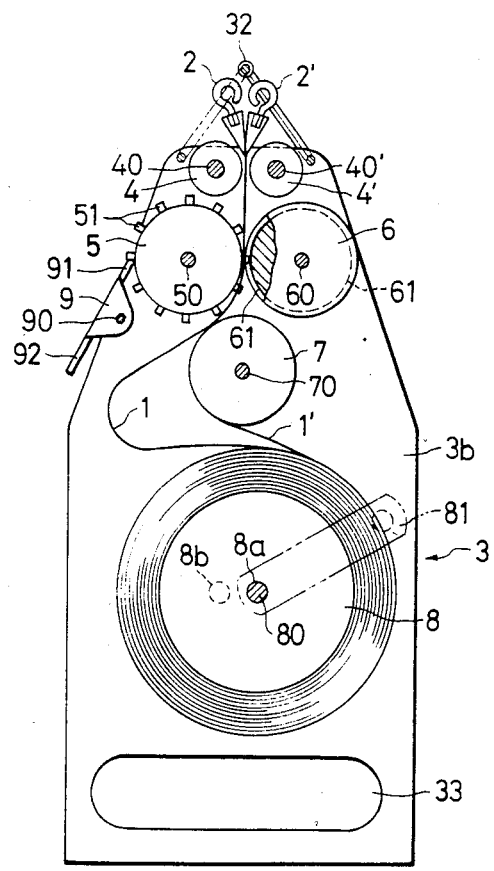
FIG. 2 is a plan view showing the internal mechanisms thereof.

The take-up wheel 8 is rotatably supported by the associated shaft 80 within the case 3, said shaft 80 being detachably provided with a handle 81 along the surface of the case 3. Although not illustrated, the take-up wheel 8 may be connected to the other fixed ends of the tapes 1 and 1' by suitable means. For example, T-shaped connectors may be formed in the fixed ends of both tapes by cutting, and an elongated slot having a length and width equal to that of the lateral piece and that of the longitudinal piece of each connector may be formed in the periphery of the take-up wheel, correspondingly. The T-shaped connectors are then inserted in the elongated slot and rotated through 90° to make the tapes parallel with the periphery of the take-up wheel and to engage the connectors with the inside of the elongate slot, whereby both tapes 1 and 1' are rolled around the wheel 8 in superposed relation. Since the unextensible tapes 1 and 1' are simultaneously rolled around the take-up wheel 8, the inside tape 1 is rolled up in a gradually decreasing amount depending upon the thickness of both tapes 1 and 1'. On the other hand, since the ratchets 51 of the wheel 5 are then in engagement within the holes 11 in both tapes 1 and 1', the tape 1 slackens into a loop as shown in FIG. 2, as it is rolled up between the wheels 5 and 8. The relay wheel then serves to facilitate the formation of such a loop.

The shafts 40 and 50 of the wheels 4 and 5 are arranged symmetrically with respect to the shafts 40' and 60 of the wheels 4' and 6 about the center axis of the case 3, on which the shaft 70 of the relay wheel 7 is located. In such a shaft arrangement, if the shaft 80 of the take-up wheel is located in a position that is eccentric from the center axis toward the grooved wheel 6, there is then left a larger space around the relay wheel 7, which results in an increase in the curvature of the loop the tape 1 forms.

The stop pawl 9 includes its leading end 91 terminating on the periphery of the ratchet wheel 5, and is supported by the associated shaft 90 on the case. In a normal state, the leading end 91 is engaged with the ratchet wheel 5 by a spring (not shown). However, giving a push to the trailing end 92 of the pawl 9 allows the leading end 91 to be spaced away from the periphery and ratchets 51 of the wheel 5.

If a push is applied to the trailing end 92 of the stop pawl 9, the ratchet wheel 5 is freely rotatable, since the leading end 91 of the pawl 9 is spaced away from the ratchet 51. Thereupon, a push is given to the free end of the tape 1 or 1', whereby the tapes 1 and 1' are withdrawn. After the tapes are withdrawn by the desired length, the stop pawl 9 is no longer pushed, so that the stop pawl is engaged with the ratchet wheel 5 under the action of the spring in the direction along which it advances. In consequence, the ratchet wheel 5 is restrained from rotating in the direction of withdrawal of the tapes, so that the tapes stop. To roll up the tapes, the take-up wheel 8 is rotated in the rolling-up direction without touching the stop pawl 9. Even when the stop pawl 9 comes into contact with the ratchet wheel 5, the ratchets 51 of the latter wheel pass while forcing up the pawl against the action of the spring, so that the tapes are rolled around the take-up wheel with no difficulty.

Since the take-up roll 8 is positioned off the center axis of the case 3, the plates 3a and 3b are formed in the same shape, provided that two holes 8a and 8b are formed therein at symmetrical positions with respect to each other around the center axis of the case 3. In this arrangement, the shaft 80 may be inserted through either one of the holes 8a and 8b. Although the remaining hole then may not be used, that hole is advantageous in that another member can be inserted therethrough to stop the rotation of the take-up wheel and the shaft 80, so that the handle 81 can be rotated in the opposite direction for its removal.

It is to be noted that the case 3 is provided at the open end with a reference point 31 as well as guides 32 extending in the tape withdrawal direction to protect the free ends of the tapes and the hooks 2 and 2', and at the other end with an opening 33 for convenience in carrying.

Reference will now be made to how to use the right-angle index device according to the present invention.

Figure 3:
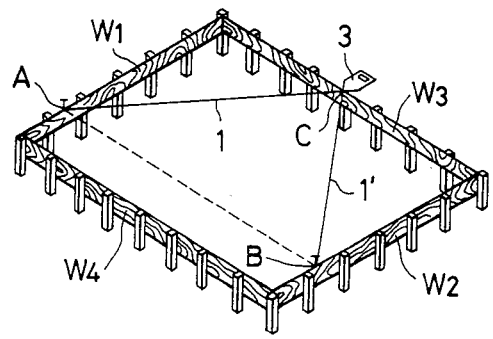
FIGS. 3 to 5 inclusive are views showing how to use that embodiment.
Figure 4:
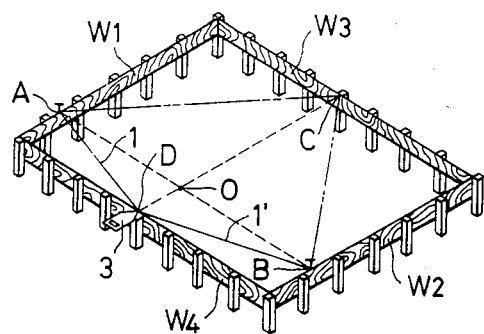
Figure 5:
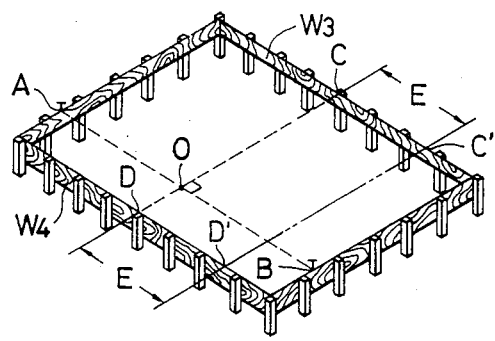

As shown in FIG. 3, pegs are driven in reference points A and B on first and second sides W1 and W2 of the framework placed in a field of construction work. The hooks 2 and 2' of the tapes 1 and 1' are respectively hung on the pegs driven in the points A and B. Both tapes 1 and 1' are withdrawn equally, so that the reference point 31 on the open end of the case 3 is aligned with a point on a third side W3 of the framework under the tension of both tapes 1 and 1' for tentative marking. This point is now used as a point C. While the hooks 2 and 2' remain hung on the pegs, the reference point 31 is likewise aligned with a point on a fourth side W4 of the framework under the tension of both tapes 1 and 1' for tentative marking. This fourth point is now used as point D. (FIG. 4) Both tapes 1 and 1' being equally withdrawn in this state, $\Delta ABC$ and $\Delta ABD$ form equilateral triangles which share the base AB with a line connecting the apex C with D intersecting the base AB at a right angle. Thus, a line CD is moved in parallel to a line C'D' by connecting a point C' on the third side W3 with a point D' on the fourth side W4 (FIG. 5), said points C' and D' being spaced away from the line CD by the equal length.

While the present invention has been described with reference to the preferred embodiment, it is to be understood that many changes or modifications may be made without departing from the scope as defined in the appended claim.

What is claimed is:

1. A right-angle index device comprising, in combination:
    (A) a flat elongated casing having a longitudinal axis, a first end defining an exit end, and a second end;
    (B) a take-up wheel disposed in said casing at the second end thereof;
    (C) a ratchet wheel having a plurality of teeth around the circumference thereof, and an idler wheel having a circumferential groove, said ratchet and idler wheels being symmetrically disposed about said longitudinal axis near said first end with said teeth engaging said groove, the axes of rotation of all said wheels being parallel to each other and perpendicular to said longitudinal axis;
    (D) two unextensible tapes superimposed upon each other and having one end fixed to said take-up wheel, whereby both of said tapes are wound simultaneously on said take-up wheel, said superimposed tapes simultaneously passing from said take-up wheel between said ratchet and idler wheels, and then out through said exit end of said casing; and
    (E) pawl means selectively engageable with said ratchet wheel to permit unimpeded withdrawal of said tapes and selective rewinding thereof.

2. A device as defined in claim 1, further comprising a pair of guide wheels symmetrically disposed about said longitudinal axis at said exit end, said tapes passing between said guide wheels after passing said ratchet wheel.

3. A device as defined in claim 2, further comprising a relay wheel disposed between said take-up wheel and said ratchet and grooved wheels with its axis of rotation on said longitudinal axis, whereby the outermost of said tapes when wound on said take-up wheel is guided on said relay wheel while the innermost of said tapes forms a loop as said tapes are wound on said take-up wheel.

4. A device as defined in claim 1, wherein said take-up wheel is located with its axis of rotation to one side of said longitudinal axis.

5. A device as defined in claim 4, further comprising a relay wheel disposed between said take-up wheel and said ratchet and grooved wheels with its axis of rotation on said longitudinal axis, whereby the outermost of said tapes when wound on said take-up wheel is guided on said relay wheel while the innermost of said tapes forms a loop as said tapes are wound on said take-up wheel.

6. A device as defined in claim 1, further comprising a relay wheel disposed between said take-up wheel and said ratchet and grooved wheels with its axis of rotation on said longitudinal axis, whereby the outermost of said tapes when wound on said take-up wheel is guided on said relay wheel while the innermost of said tapes forms a loop as said tapes are wound on said take-up wheel.

7. A device as defined in claim 1, in which said two unextensible tapes each include a continuity of holes formed at regular intervals in the lengthwise direction, and are arranged such that they are superimposed upon each other in the same phase; and said teeth are engageable within said continuity of holes, and said grooved wheel retains said both tapes in cooperation with said ratchet wheel.

8. A device as defined in claim 7, further comprising a relay wheel disposed between said take-up wheel and said ratchet and grooved wheels with its axis of rotation on said longitudinal axis, whereby the outermost of said tapes when wound on said take-up wheel is guided on said relay wheel while the innermost of said tapes forms a loop as said tapes are wound on said take-up wheel.

* * * * *